Aug. 27, 1946.      P. J. BURCHETT      2,406,662
VALVE MECHANISM
Filed Sept. 14, 1944
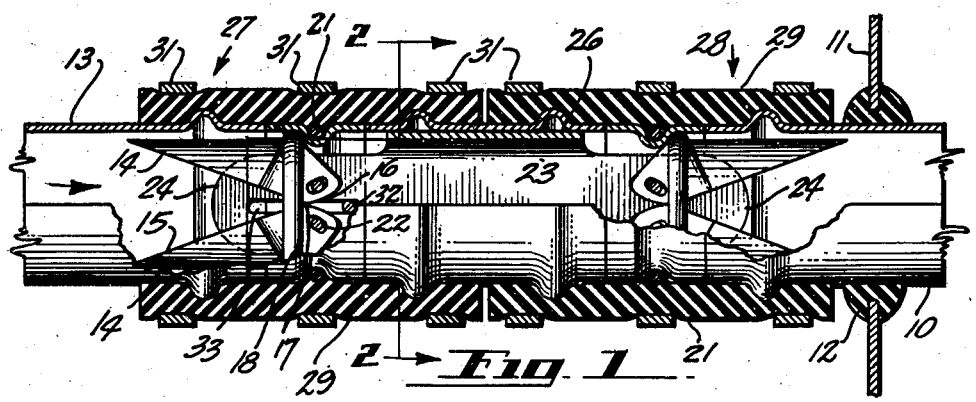
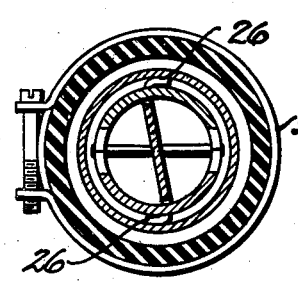
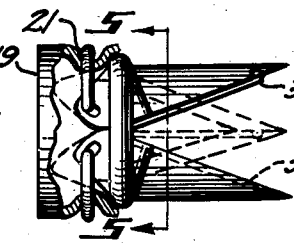
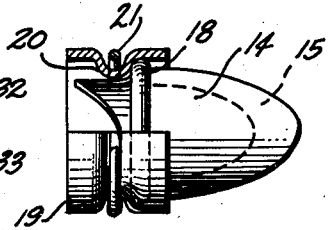
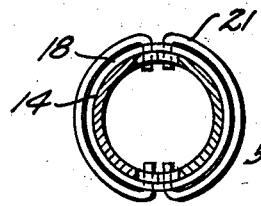
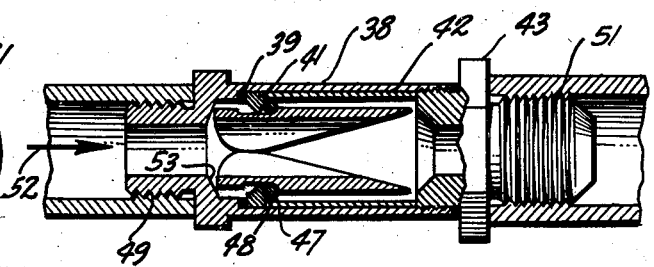
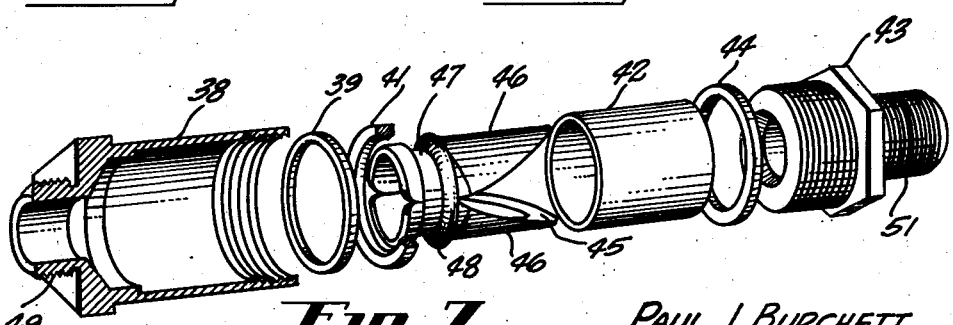
PAUL J. BURCHETT
INVENTOR.
BY George J. Smyth Patented Aug. 27, 1946

2,406,662

UNITED STATES PATENT OFFICE 2,406,662

VALVE MECHANISM

Paul J. Burchett, Glendale, Calif.

Application September 14, 1944, Serial No. 553,978

14 Claims. (Cl. 284—18)

This invention relates to valve mechanisms and more particularly to valve mechanism for controlling the flow of fluids in a conduit.

The valve mechanism of the present invention is particularly adapted for use as a check valve in the oil lines of an aircraft engine although its use is not limited to that field. The mechanism can be used in any fluid installation where a simple but very effective control is desired.

In present day aircraft engines check or non-return valves are provided at the jointure between the oil supply lines and those leading to the engine. These valves have generally consisted of ball or cone valves normally held open by some suitable means against the action of springs. When the oil supply lines are removed from the lines of the engine the means holding the balls or cones away from their seats are rendered inoperative and the springs urge the balls or cones against the seats and seal the open ends of the lines against leakage.

The balls or cones of these valves must of necessity be larger in diameter than the lines with which they are used. Thus the valve housing must be of a diameter considerably larger than the diameter of the line to permit the oil to flow around the ball or cone when the same is displaced from the seat. This complicates assembly of the lines and the engine in the fuselage of the aircraft. These valve mechanisms are also subject to the criticism that they restrict the flow of the oil through the lines as the oil must flow around the ball or cone to pass the valve formed by the same.

The valve mechanism of the present invention obviates those difficulties for the same is no larger in diameter than the line with which it is to be used. Thus the valve herein disclosed may be assembled with an oil line and passed with the line through an opening in a structural part. This feature of the invention eliminates the necessity of assembling the valve after the line has been passed through the opening as is required in the assembly of the previously proposed ball or cone valves.

The valve mechanism in one form of the invention comprises a pair of identical trough-shaped clappers mounted so that when the edge faces thereof are in facewise engagement the same substantially form a flattened conically shaped assembly. The edges faces of the clappers are each formed with a fulcrum point about which each clapper rocks relative to the other. A resilient member encircling the base of the conically shaped assembly is displaced from the fulcrum point and the force exerted by the resilient member is sufficient to normally hold the clappers closed with the entire surfaces of the edge faces thereof in facewise engagement. When the clappers are in this relative position the valve formed by the same is closed and when the clappers are rocked about the respective fulcrum points to move the edge faces in opposite directions the valve is open.

The clappers need be only of such a size as to permit their insertion with the line when assembled and held together by the encircling resilient member. Thus no enlarged housings are required in the valve mechanism of the present invention to complicate assembly of the oil lines and engines with the fuselage of the aircraft.

The clappers when open, as the interior surfaces form a substantially cylindrical passage, offer relatively little obstruction to the flow of oil thru the valve formed by the same. Thus the inherent obstructional disadvantage of the ball or cone valves previously proposed is overcome in the valve mechanism of the present invention.

The meeting faces of the clapper are substantially elliptical in shape and present relatively large areas for effectively sealing the passage between the clappers when the same are closed. If desired the seal can be augmented by forming one face with some suitable means and the other face with cooperating means for increasing the seal when the clappers are in closed position.

The valve mechanism of the present invention can also be effectively used as a check valve in a line where the flow through the same can be used to operate the clappers or leaves. In this form of the present invention, the clappers are held open by the normal flow of the fluid and closed by either a cessation of flow or a reversal in the direction of flow.

Other features and advantages of the present invention will be apparent from the following description taken in connection with the accompanying drawing in which:

Figure 1 is a view partly in section and partly in elevation of one embodiment of the valve mechanism of the present invention;

Figure 2 is section taken along line 2—2 of Figure 1;

Figure 3 is an elevational view showing in open position a modified form of the valve of the present invention, the broken line illustration showing the valve in closed position;

Figure 4 is a view partly in section and partly in elevation of the valve shown in Figure 1;

Figure 5 is a section taken along line 5—5 of Figure 3;

Figure 6 is a sectional view of another form of the valve mechanism of the present invention; and Figure 7 is an exploded view of the mechanism of Figure 6.

The valve mechanism of the present invention may take the form illustrated in Figure 1 in which 10 indicates a line or conduit leading to the engine of an aircraft. The line is passed through an opening in the firewall 11, the opening being sealed by some suitable means such as the grommet 12.

The line 10 is to be connected to a line 13 leading from the oil storage means of the aircraft. As it is many times necessary to detach the engine line 10 from the storage line 13 it has been necessary to mount at the jointure between the two lines some valve mechanism for preventing oil from draining from both the engine and storage means when the lines are disconnected.

The valve mechanism shown by Figure 1 is well adapted to serve as a check valve for each line. In this adaptation of the present invention, a valve is disposed in each line and is so arranged therein that oil can not flow or drain from either line after the lines have been separated or disconnected. Each valve unit comprises a pair of substantially trough-shaped or scoop-like clappers or leaves 14. Each clapper is formed with an open end and the concavity decreases from the open end toward the opposite end of the same.

The clappers are mounted with their concave surfaces in juxtaposition as illustrated in Figure 2. Thus the edge faces 15 of the clappers face each other and facewisely engage each other when the clappers are closed. As the outline of the edge face 15 of each clapper is substantially that of half an ellipse the two clappers when closed form a conoidal member such as clearly illustrated in full lines in Figure 4 and in broken lines in Figure 3.

The edge face adjacent the rear or larger end of each clapper is cut back as shown at 16 to the end that the clappers may be rocked about the fulcrums formed at 17. It will be seen that when the clappers are rocked toward each other they form a bivalvular closure means and effect a clam-like joint but when they are rocked in the opposite direction to separate the smaller ends of the same a substantially cylindrical shaped passage is formed therebetween.

To prevent the clappers from separating and to maintain the edge faces in engagement, a ring 18 of some resilient material such as rubber encircles the clappers and yieldably urges the same together. The fulcrums 17 of each clapper are displaced rearwardly of the ring 18, which is held in a suitably formed groove extending about the clappers, so that the ring acts through the lever arm formed by the displacement of the ring relative to the fulcrum 17 to normally hold the edge faces 15 of the clappers in engagement.

The pair of clappers are mounted within a tubular member or mounting band 19 having a reduced or restricted portion formed by internally flaring the band 19 intermediate the ends thereof to form an annular shoulder 20. The inner diameter of the shoulder 20 is less than the outer diameter of the ring 18 so that the ring and clappers are held against movement in one direction longitudinally of the band 19 by the engagement between the ring 18 and the shoulder 20.

To hold the clappers against turning relative to the mounting band 19 as well as to prevent their moving longitudinally of the same, the opposite ends of a pair of C-rings 21 are passed through openings in the band 19 and engaged in arcuate slots 22 formed in the tail portions of the clappers 14.

In the form of the invention illustrated in Figure 1, the mounting band 19 is substantially the same diameter as the lines 10 and 13. Thus, as shown in the figure referred to, a band with its associated elements when mounted at the free end of a line forms a continuation thereof.

As the valves formed by the clappers 14 will normally be closed due to the action of the encircling ring 18, means are provided, in the embodiment of the invention illustrated in Figure 1, for holding the clappers apart as long as a flow of oil is desired from line 13 to line 10.

Although any means desired may be used to hold the valve formed by the clappers open, it is now preferred to use a member 23 having a pair of oppositely extending tongues 24. The member 23 is fixed within a tubular casing 25 by spot welding a pair of flanges 26 to diametrically opposed portions of the casing as best shown in Figure 2. The casing has a diameter equal to the diameter of the mounting bands 19 and a length less than the member 23. Thus the tongues 24 project outwardly of the casing 25 at opposite ends thereof. The casing 25 is mounted between the bands 19 and the opposite ends thereof are held in engagement with the adjacent ends of the bands 19 by a pair of connectors 27 and 28, each comprising a rubber packing sleeve 29 and a plurality of clamping rings 31.

The tongues as they extend beyond the casing 25 project between the clappers 14 and normally tend to hold the same apart so that oil may flow from the line 13 into the engine line 10. It can be seen from Figure 2 that the clappers 14, as the same when open form a substantially cylindrical passage, offer little obstruction to the flow of oil. The member 23, although it extends across the flow through the casing, forms only a slight obstruction to the same because of the extremely small cross sectional area presented by the end faces of the tongues.

When it is desired to disconnect the lines 10 and 13, the clamping ring adjacent the inner end of the connector 27 is loosened until the line 13 and its associated valve can be moved to the left as viewed in Figure 1. As the casing 25 is still held tightly by the connector 28, the clappers of the valve associated with the line 13 will move out of engagement with the tongue 24 holding them apart and the ring 18 will move the clappers together to bring the edge faces thereof into engagement and thus close the line 13.

The mounting band 19 associated with the line 13 will move relative to the casing 25 until a pin 32 carried by the band engages the end of a groove 33 formed in the tongue 24. After the pin has moved the length of the slot the casing 25 will move with the band as the line 13 is pulled away from the line 10 and withdraw the other tongue from its position intermediate the clappers forming the valve of the line 10. As soon as this tongue has been withdrawn from between the clappers the same will be closed by the ring 18 and oil will be prevented from draining out of the engine.

In use, the disconnecting movement should be rapid to insure that the tongues are quickly withdrawn from their normal position between the clappers. It will be understood that the valves formed by the clappers or leaves will close and seal the lines just as rapidly as the tongues are moved out of their normal position.

As the pressure against the clappers urge the resilient rings 18 back into engagement with the internal shoulders 20 and tightly hold the rings in engagement with the same, no oil can leak around and pass the valves formed by the clappers and their mounting bands 19. The seal of the lines is complete and it will be seen that the pressure in the lines will tend to hold the clappers tightly in engagement and thus augment the sealing action of the engaged faces of the clappers. Due to the particular shape of the clappers, the edge faces thereof present relatively large areas of contact and the seal effected when the edge faces are in firm contact is remarkably good.

With both lines now sealed against the loss of oil, the two lines can be disconnected. It will be seen that the member 23 will, because of the pin and slot connection, remain with the valve associated with the line 13. As the valves formed no enlarged protuberance at the ends of the lines, the latter can be easily withdrawn through any aperture or passage large enough to pass the lines if it should be necessary to disassemble the lines from such structural parts of the aircraft as the firewall 11.

If desired, means may be provided on the edge faces of the clappers of the valve mechanism of the present invention for increasing the seal effected by the engagement of the faces. Thus as shown in Figure 5, the edge face of the clapper 35 can be formed with a lip 36 and the edge face of the other clapper with a continuous groove 37 for receiving the lip 36 when the clappers are closed. It will be understood however that the means may take other forms for obviously a sealing gasket or strip might be fixed to the edge face of one clapper or even both clappers if desired.

There is shown in Figure 6 and 7 another valve mechanism embodying the features of the present invention. This mechanism comprises a tubular casing 38 formed with an internal shoulder carrying a suitable gasket 39. A ring 41 formed with an inturned knife edge or shoulder is concentrically mounted within the casing 38 and adapted to be held against the gasket 39 by a sleeve 42 and a shouldered coupling member 43 threaded into the casing 38. A second gasket 44 is mounted over the threaded portion of the coupling member 43 to seal the connection between the casing and the latter.

In this embodiment of the present invention, the edge faces 45 of the two clappers or leaves 46, like the edge faces of the clappers 14 of the earlier described form of the present invention, are each formed with a high point so that the clappers 46, when the edge faces thereof are in engagement, can rock about the fulcrums formed by the high points. The outer surface of each clapper 46 is provided with a recess so formed that when the clappers are brought together with their edge faces in engagement a relatively wide, continuous groove 47 is formed in the outer surfaces of the assembled clappers. The groove 47 thus formed receives a resilient O-ring 48 which holds the edge faces of the clappers in engagement. The ring 48 also, because of its position relative to the fulcrums formed by the high points of the edge faces 45, normally holds the clappers closed but yet permits the same to be rocked relatively to each other. The groove also receives the shoulder of the ring 41 which holds the clappers in the desired relative position but yet permits the rocking movement described above.

To permit the valve mechanism of Figure 6 to be connected into a fluid line the casing 38 and the coupling member 43 are each formed with threaded portions 49 and 51 respectively, the orientation of the valve mechanism depending on the direction of normal flow in the line.

It will be seen that when the clappers 46 and the encircling rings 41 and 48 are mounted in the casing 38 and the sleeve 42 and the coupling member 43 assembled therewith, the valve mechanism so formed will permit a flow only in the direction of the arrow of Figure 6 when the pressure is sufficient to overcome the action of the O-ring 48.

It should now be understood that the clappers or leaves 46 will remain open as long as the flow in the direction of the arrow 52 of Figure 6 is sufficient to hold the clappers apart but if the flow should cease, the O-ring 48 will urge the clappers together and close the valve formed by the same. If the flow should be reversed in direction the clappers will also close and the pressure against the same will more firmly hold the edge faces of the clappers in engagement. Thus it will be seen that the seal will be even more effective when a reverse flow does occur.

As the form of the valve mechanism shown in Figures 6 and 7 is intended to be used in a high pressure system means must be provided for relieving the O-ring of the force exerted by the pressure against the clappers when the same are closed by a reversal in the flow. In the form of the invention now preferred, the force exerted against the clappers is taken in most part by an annular shoulder 53 formed internally of the casing 38 and against which the clappers seat when closed. To permit the clappers to properly close the seat should be so formed that the same is substantially normal to the clappers when the same are closed.

The width of the groove receiving the rings 41 and 48 is such that the clappers may move slightly in a direction axially of the casing 38 so that the pressure exerted on the clappers when the flow is opposite to normal will cause the O-ring to move back and be firmly held against the shoulder of the ring 41. This effectively seals the joint between the rings and prevents any leakage around the valve mechanism without placing too great a pressure on the O-ring 48.

It will be seen that in all forms of the invention illustrated the sealing action of the bi-valvular closure is enhanced by the pressure exerted against the clappers upon a flow in the direction opposite to the desired or normal direction of flow. All embodiments of the invention herein shown and described also are capable of securing a fluid tight seal without unduly restricting the normal flow when the valves are open.

Although the now preferred embodiments of the present invention have been illustrated and described herein, it should be understood that the invention is not to be limited thereto for it is susceptible to changes in form and detail within the scope of the appended claims.

I claim:

1. A valve mechanism comprising a pair of substantially trough-shaped clappers having one end open and decreasing in depth toward the other end; yieldable means circumscribing said clappers and normally holding the edge faces thereof in facewise engagement; means on said edge faces forming fulcrums whereby said clappers may rock relative to each other; a casing for housing said clappers; means for holding said clappers within said casing; and an annular shoulder formed internally of said casing, said circumscribing means adapted to engage said shoulder and seal the annular passage formed between said clappers and the inner wall of said casing.

2. A valve mechanism comprising a casing; a pair of concave clappers mounted within said casing with the concave surfaces thereof in juxtaposition, each clapper having an open end and decreasing in depth from said open end to the opposite end thereof; yieldable means encircling said clappers and normally holding the edge faces thereof in facewise engagement; the edge face of each clapper being cut away adjacent the open end thereof to form fulcrums about which each clapper may rock relative to the other, said clappers forming a bivalvular means closing said casing when in said normal position, said clappers being relatively movable about said fulcrums to a position in which said shallow ends are spaced apart; and an inturned shoulder formed within said casing and adapted to be engaged by said encircling means to seal the annular passage between said clappers and said casing.

3. A valve mechanism of the type described comprising, a tubular casing; means for connecting said casing into a fluid line; conoidal bivalvular means movably mounted within said casing for movement longitudinally of the same, said means comprising a pair of scoop-like clappers mounted with their concave surfaces in juxtaposition, each clapper being rockable on the edge face of the other clapper from a closed position to an open position; resilient means encircling said clappers and normally holding the same with the edge faces in facewise engagement; and means within said casing for taking the longitudinal thrust of the clappers when the fluid is exerting a force on the same in closed position.

4. A valve mechanism comprising a pair of scoop-like clappers; each clapper open at the large end thereof and having an edge face formed with a pair of fulcrums adjacent the larger end thereof; means encircling said clappers for resiliently holding said clappers with the edge faces thereof in facewise engagement, said means permitting each clapper to be forced about the fulcrums of the other clapper; a casing housing said clappers; means for connecting said casing into a fluid line, said clappers closing said casing to a flow of fluid when said edge faces are in facewise engagement, said casing being open to the flow when said clappers are forced apart about said fulcrums; and means cooperative with said encircling means to seal the annular passage between said clappers and said casing when said clappers are closed and the flow is exerting a force against said closed clappers.

5. A valve mechanism comprising a pair of scoop-like clappers; each clapper open at the large end thereof and having an edge face formed with a pair of fulcrums adjacent the larger end thereof; resilient means encircling said clappers, said means being displaced from said fulcrums and normally urging each clapper about said fulcrums toward the other clapper whereby said clappers are normally held with the edge faces thereof in facewise engagement, said resilient means permitting said clappers to be rocked relatively to each other about said fulcrums whereby said clappers can be moved apart to form a substantially cylindrical passage therebetween; a casing for housing said clappers for movement longitudinally of said casing; means for limiting said longitudinal movement of said clappers between alternate positions in said housing; means for connecting said casing into a fluid line, said clappers in the normal position thereof closing said casing to a flow of fluid, said casing being open when said clappers are rocked apart to form said cylindrical passage.

6. A valve mechanism comprising a pair of scoop-like clappers mounted on their edge faces for rocking movement relative to each other about fulcrums formed adjacent the larger ends of said clappers, the edge faces of said clappers intermediate said fulcrums and the smaller ends thereof being uniplanar and adapted to form a seal when in facewise engagement; resilient means encircling said clappers intermediate said fulcrums and the smaller ends of said clappers for normally holding said edge faces in engagement, said resilient means permitting said clappers to be rocked about said fulcrums to move said edge faces out of engagement and the smaller ends of said clappers apart to form a substantially cylindrical passage between said clappers; a tubular member having an annular shoulder formed therein; means for mounting said clappers within said member with the encircling means engaging said shoulder and cooperating with the same to seal the passage between said clappers and said tubular member; and means for connecting said tubular member into a fluid line.

7. A valve mechanism comprising a pair of scoop-like clappers mounted on their edge faces for rocking movement relative to each other about fulcrums formed adjacent the larger ends of said clappers; a lip formed on the face of one of said clappers intermediate its fulcrum and the smaller end thereof, the face of the other of said clappers being formed with a groove for receiving said lip and forming a seal when said clappers are in facewise engagement; a ring of resilient material encircling said clappers intermediate said fulcrums and the smaller ends of said clappers for normally holding said edge faces in engagement, said ring permitting said clappers to be rocked about said fulcrums to move said edge faces out of engagement and the smaller ends of said clappers apart to form a passage between said clappers; a tubular member having an annular shoulder formed therein; means for mounting said clappers within said member with the ring encircling said clappers engaging said shoulder and cooperating with the same to seal the passage between said clappers and said tubular member; and means for connecting said tubular member into a fluid line.

8. A valve mechanism comprising a pair of scoop-like clappers mounted on their edge faces for rocking movement relative to each other about fulcrums formed adjacent the larger ends of said clappers; means carried by the edge faces of said clappers intermediate said fulcrums and the smaller ends thereof for forming a seal when said faces are in facewise engagement; resilient means encircling said clappers intermediate said fulcrums and the smaller ends of said clappers for normally holding said edge faces in engagement, said resilient means permitting said clappers to be rocked about said fulcrums to move said edge faces out of engagement to form a passage between said clappers; a tubular member having an annular shoulder formed therein; means for mounting said clappers within said member with the encircling means engaging said shoulder and cooperating with the same to seal the passage between said clappers and said tubular member; and means for connecting said tubular member into a fluid line.

9. A valve mechanism for sealing the ends of a pair of fluid lines when the same are disconnected comprising a tubular member adapted to be mounted to the open end of each line; a pair of scoop-like clappers mounted within each member, said clappers being mounted on their edge faces for rocking movement relative to each other about fulcrums formed adjacent the larger ends of said clappers; resilient means encircling said clappers and normally holding the edge faces thereof in facewise engagement, said resilient means permitting said clappers to be rocked about said fulcrums to form a cylindrical passage therebetween and concentric with said tubular member; and means for interconnecting said lines, said means including means for engaging the clappers of each tubular member and forcibly rocking the clappers of each tubular member about said fulcrums and holding said clappers apart whereby said cylindrical passage is formed between each pair of clappers and fluid may flow from one line into the other; said last named means moving out of engagement with said clappers when said interconnecting means is disconnected from said lines.

10. A valve mechanism for sealing the ends of a pair of fluid lines when the same are disconnected comprising a tubular member adapted to be mounted to the end of each line; a pair of scoop-like clappers mounted within each member, said clappers being mounted on their edge faces for rocking movement relative to each other about fulcrums formed adjacent the larger ends of said clappers; resilient means encircling said clappers and normally holding the edge faces thereof in facewise engagement, said resilient means permitting said clappers to be rocked about said fulcrums to form a cylindrical passage therebetween concentric with said tubular member; and means for interconnecting the open ends of said lines, said means including means extending between the clappers of each tubular member and holding said clappers apart whereby said cylindrical passage is formed between each pair of clappers and fluid may flow from one line into the other, the disconnection of said interconnecting means moving said extending means from between said clappers whereby said resilient means of each pair of clappers moves the same together to bring the edge faces thereof into engagement and close the tubular member to a flow of fluid.

11. A valve mechanism for sealing the ends of a pair of fluid lines when the same are disconnected comprising a mounting band adapted to be mounted to the end of each line; a pair of scoop-like clappers mounted within each band, said clappers being mounted on their edge faces for rocking movement relative to each other about fulcrums formed adjacent the larger ends of said clappers; resilient means encircling said clappers and normally holding the edge faces thereof in facewise engagement, said resilient means permitting said clappers to be rocked about said fulcrums to separate the smaller ends of said clappers and form a cylindrical passage therebetween concentric with said tubular member; a tubular member adapted to be inserted between said mounting bands to form a continuation of said lines; means carried by said tubular member and extending outwardly of the opposite ends thereof for reception between each pair of clappers for holding the smaller ends of said clappers apart against the action of said resilient means; and means for connecting one of said mounting bands to the extending means whereby said mounting band may move relative to said extending means a distance sufficient to displace said extending means from between said clappers whereafter said tubular member moves with said mounting band whereby the other of said extending means will be displaced from between the other of said clappers.

12. A valve mechanism comprising a pair of scooplike clappers; each clapper open at the large end thereof and having an edge face formed with a pair of fulcrums adjacent the larger end thereof; resilient means for normally holding said clappers with the edge faces thereof in facewise engagement, said resilient means permitting each clapper to be forced about the fulcrums of the other clapper; a casing; means for mounting said clappers in said casing for limited longitudinal movement; means for connecting said casing into a fluid line, said clappers closing said casing to a flow of fluid when said edge faces are in facewise engagement, said casing being open to the flow when said clappers are forced apart about said fulcrums; and means formed internally of said casing for restricting downstream movement of said clappers and for sealing the annular passage between said clappers and said casing when said clappers are closed and the fluid flow is exerting a force against said clappers.

13. A valve mechanism comprising a pair of scooplike clappers mounted on their edge faces for rocking movement relative to each other about fulcrums formed adjacent the larger ends of said clappers, the edge faces of said clappers intermediate said fulcrums and the smaller ends thereof being uniplanar and adapted to form a seal when in facewise engagement; resilient means acting against said clappers intermediate said fulcrums and the smaller ends of said clappers and normally holding said edge faces in sealing engagement, said resilient means permitting said clappers to be rocked about said fulcrums to move said edge faces out of engagement to form a passage between said clappers; a tubular member, said clappers being movably mounted within said tubular member for longitudinal movement therein; an annular shoulder formed within said member, said shoulder having an inner diameter less than the outer diameter of said clappers when mounted on their edge faces and restricting movement of said clappers in one direction longitudinally of said member, said shoulder when said clappers are engaging the same closing the annular passage between said clappers and said member; and means for connecting said tubular member into a fluid line.

14. A valve mechanism comprising a pair of scooplike clappers; each clapper open at the large end thereof and having an edge face formed with a pair of fulcrums adjacent the larger end thereof; means encircling said clappers for resiliently holding said clappers with the edge faces thereof in facewise engagement, said means permitting each clapper to be forced about the fulcrums of the other clapper; a casing housing said clappers; means for connecting said casing into a line containing a fluid under pressure, said clappers closing said casing to a flow of fluid when said edge faces are in facewise engagement, said casing being open to the flow when said clappers are forced apart about said fulcrums; means cooperative with said encircling means to seal the annular passage between said clappers and said casing when said clappers are closed and the pressure is exerting a force against said closed clappers; and means formed integral with said casing and against which the ends of said clappers seat when the force exerted by the pressure of the fluid exceeds a predetermined pressure.

PAUL J. BURCHETT.